United States Patent
Grupp

(10) Patent No.: US 7,599,813 B2
(45) Date of Patent: *Oct. 6, 2009

(54) METHOD AND MACHINE FOR DETERMINING A SPACE COORDINATE OF A MEASUREMENT POINT ON A MEASUREMENT OBJECT

(75) Inventor: Guenter Grupp, Boehmenkirch (DE)

(73) Assignee: Carl Zeiss Industrielle Messtechnik GmbH, Oberkochen (DE)

( * ) Notice: Subject to any disclaimer, the term of this patent is extended or adjusted under 35 U.S.C. 154(b) by 0 days.

This patent is subject to a terminal disclaimer.

(21) Appl. No.: 11/827,063

(22) Filed: Jul. 10, 2007

(65) Prior Publication Data

US 2008/0033690 A1 Feb. 7, 2008

Related U.S. Application Data

(63) Continuation of application No. PCT/EP2006/000062, filed on Jan. 5, 2006.

(30) Foreign Application Priority Data

Jan. 18, 2005 (DE) .............. 10 2005 003 322

(51) Int. Cl.
*G01B 21/04* (2006.01)

(52) U.S. Cl. .................. 702/152; 702/95; 702/168; 33/502; 33/503; 33/702; 33/568; 33/1 M; 356/600; 700/192; 700/193; 700/195

(58) Field of Classification Search .............. 702/95, 702/85, 168, 150, 152, 153, 155; 33/502, 33/503, 543–544.5, 611, 504, 702, 568, 704, 33/556, 1 M, DIG. 21; 356/498, 600, 614; 700/161, 163, 192, 193, 195, 110, 159, 177

See application file for complete search history.

(56) References Cited

U.S. PATENT DOCUMENTS

| | | | | |
|---|---|---|---|---|
| 5,333,386 A | * | 8/1994 | Breyer et al. | 33/1 M |
| 5,471,406 A | * | 11/1995 | Breyer et al. | 702/168 |
| 5,610,846 A | * | 3/1997 | Trapet et al. | 702/95 |
| 5,701,677 A | * | 12/1997 | Yamaguchi et al. | 33/1 M |
| 6,012,022 A | * | 1/2000 | Michiwaki | 702/168 |
| 6,070,335 A | * | 6/2000 | Pritschow | 33/568 |
| 6,158,136 A | * | 12/2000 | Gotz et al. | 33/503 |
| 6,230,070 B1 | * | 5/2001 | Yodoshi | 700/162 |
| 6,587,810 B1 | * | 7/2003 | Guth et al. | 702/168 |
| 6,701,633 B2 | * | 3/2004 | Ohtsuka | 33/552 |
| 6,778,867 B1 | * | 8/2004 | Ziegler et al. | 700/79 |
| 6,819,974 B1 | * | 11/2004 | Coleman et al. | 700/195 |
| 6,829,838 B1 | * | 12/2004 | Weekers et al. | 33/702 |
| 7,059,063 B2 | * | 6/2006 | Weekers et al. | 33/702 |
| 7,191,541 B1 | * | 3/2007 | Weekers et al. | 33/702 |
| 7,227,647 B2 | * | 6/2007 | Ferger | 356/600 |
| 7,249,421 B2 | * | 7/2007 | MacManus et al. | 33/503 |
| 2002/0148275 A1 | * | 10/2002 | Abbe | 73/1.01 |
| 2002/0189319 A1 | * | 12/2002 | Abbe | 73/1.01 |

* cited by examiner

*Primary Examiner*—Carol S Tsai
(74) *Attorney, Agent, or Firm*—Harness, Dickey & Pierce, P.L.C.

(57) ABSTRACT

For determining a space coordinate of a measurement point on a measuring object, the measurement point is approached with a probe head arranged on a displacement mechanism having at least two supports movable parallel to one another. Each support is moved by its own drive. The space coordinate of the measurement point is determined as a function of the respective displacement position of the supports. The two drives are controlled by a common regulator.

19 Claims, 5 Drawing Sheets

METHOD AND MACHINE FOR DETERMINING A SPACE COORDINATE OF A MEASUREMENT POINT ON A MEASUREMENT OBJECT

CROSS REFERENCES TO RELATED APPLICATIONS

This application is a continuation of international patent application PCT/EP2006/000062, filed on Jan. 5, 2006 designating the U.S., which international patent application has been published in German language as WO 2006/077017 A1 and claims priority from German patent application DE 10 2005 003 322.9, filed on Jan. 18, 2005. The entire contents of these priority applications are incorporated herein by reference.

BACKGROUND OF THE INVENTION

The present invention relates to a method and a machine for determining a space coordinate of a measurement point on a measuring object. More particularly, the invention relates to a method and a coordinate measuring machine, wherein a probe head is moved by means of a displacement mechanism comprising a first and a second support each driven from a separate drive.

Generally, the space coordinates of a measurement point are determined by approaching the measurement point with a movable probe head of a coordinate measuring machine. In the case of tactile coordinate measuring machines, the measurement point is touched with a touching element (generally a touch pin or stylus). The position of the probe head and, optionally, the deflection of the stylus in space then make it possible to determine the desired space coordinates of the measurement point. Similar considerations apply to coordinate measuring instruments with optical or otherwise non-contact probe heads. In this case as well, the probe head is approached to the desired measurement point. As will be readily appreciated, the measurement accuracy depends strongly on how accurately the respective position of the probe head can be determined when approaching the measurement point.

Measurement errors may have various causes. One cause of error is due to manufacturing tolerances in the guides of the coordinate measuring instrument as well as elastic deformations of the coordinate measuring instrument, as a function of the gravitational moment which the probe head exerts on the displacement mechanism in its respective travel position. Further causes of error may be positional deviations of the probe head, which arise because of and/or during the travel movements. These include for example oscillations which may occur when starting and braking the probe head. For coordinate measuring machines in portal or gantry design (i.e. coordinate measuring machines having a movable bridge on two mutually separated supports movable parallel to one another), measurement errors may also occur owing to lack of synchronicity in the travel movements of the two supports. For example, if the left-hand support is moved further in the Y axis by a distance $\Delta Y$ than the right-hand support, then this leads to a rotation of the probe head about an axis (typically the Z axis) orthogonal to the Y axis. This leads to measurement errors both in the Y direction and in a second orthogonal direction (typically the X axis).

Another cause of error for coordinate measuring machines in portal or gantry design may be deformations, which arise because the two parallel supports are moved under constraint, i.e. the drive forces work against the existing linear guides. Furthermore, such a situation also leads to increased wear.

In the case of coordinate measuring machines having two supports movable parallel to one another, it is therefore desirable to move the two supports as synchronously as possible on the one hand and, on the other hand, to avoid work by the supports against the guides.

SUMMARY OF THE INVENTION

In view of the above, it is an object of the invention to provide a method for determining a space coordinate of a measurement point on a measurement object by means of a coordinate measuring machine having two separate drives for driving two supports in parallel such that a synchronous and unconstrained movement can be achieved for the two supports in an easy and convenient manner. It is also an object to provide a corresponding coordinate measuring machine.

According to a first aspect, there is provided a method for determining at least one space coordinate of a measurement point on an object to be measured, comprising the steps of providing a probe head arranged on a displacement mechanism which comprises a first and a second support movable parallel to one another, the first support being actuated by a first drive and the second support being actuated by a second drive, approaching the measuring point with the probe head, determining a first displacement position of the first support and determining a second displacement position of the second support, determining an actual difference value representative of an actual difference between the first and second displacement positions, providing a static difference value which represents a static difference between the first and second displacement positions, subtracting the static difference value from the actual difference value in order to obtain a dynamic difference value, and determining the space coordinate of the measurement point as a function of at least one of the first and second displacement positions, wherein the two drives are controlled by a common regulator which generates a separate setpoint value for each drive as a function of the dynamic difference value.

According to another aspect there is provided a method for determining at least one space coordinate of a measurement point on an object to be measured, comprising the steps of approaching the measuring point with a probe head arranged on a displacement mechanism which comprises a first and a second support movable parallel to one another, the first support being actuated by a first drive and the second support being actuated by a second drive, determining a first displacement position of the first support and a second displacement position of the second support, and determining the space coordinate of the measurement point as a function of the first and second displacement positions, wherein the two drives are controlled by a common regulator which generates a separate setpoint value for each drive.

According to yet another object, there is provided a coordinate measuring machine for determining a space coordinate of a measurement point on an object to be measured, comprising a displacement mechanism having a first and a second support movable parallel to one another, a probe head arranged on the displacement mechanism for approaching the measuring point, a first drive for moving the first support and a second drive for moving the second support, a first and a second measuring instrument for determining a first displacement position of the first support and for determining a second displacement position of the second support, a first subtractor for determining an actual difference value representing an actual difference between the first and second displacement positions, a memory providing a static difference value representing a static difference between the first and second displacement positions, a second subtractor for subtracting the static difference value from the actual difference value in order to obtain a dynamic difference value, a common regulator configured to control the first and second drives, and a calculation unit for determining the space coordinate as a function of at least one of the first and second displacement positions, wherein the common regulator is configured to generate a separate setpoint value for each drive as a function of the dynamic difference value.

Accordingly, a common regulator is used which generates the setpoint values (either in digital form or as analog control signals) for the two drives. In other words, the common regulator receives an actual value or an actual signal on the input side, which is equally representative of the kinematic state of the two drives. The common regulator can therefore actuate the two drives essentially in the same way. Furthermore, the use of a common regulator allows very simple and cost-effective production with relatively few components and little outlay for setup and adjustment work. Yet on the other hand, the common regulator generates a separate setpoint value for each of the drives, so that the two drives can be operated with minor differences despite the fundamental synchronism. In this way, the travel movements of the two supports can be controlled individually—within certain limits—in order to compensate for tolerances in the respective guides and between the drives.

Conventionally, regulating concepts in which one drive is controlled as a master and the second drive as a slave have been used in such situations. The slave drive would follow the master drive within the achievable accuracy. Such a concept requires two complete control loops, however, and it is an inherent property that the slave drive always lags after the master drive. The synchronicity of the two drives is therefore limited to the tracking of the slave drive.

In contrast thereto, both drives are now actuated equally, i.e. neither follows the other. Rather, the effect achieved by the new regulating concept is that the two drives are actuated "like a single drive", although the common regulator is capable of compensating for differences between the two drive travels.

Overall, the new approach allows a very simple and cost-effective production which permits movement of the mutually parallel supports with high synchronicity. At the same time, it is possible to avoid moving the supports against the respective guides since the common regulator can balance the individual properties of the two drive travels, by generating a separate setpoint value for each drive.

Owing to the new method, a coordinate measuring machine can be operated with high accuracy and little wear. Measurement errors, which arise from the deformation of the coordinate measuring machine owing to lack of synchronicity and/or because the supports travel against the guides, are substantially reduced.

In one configuration of the invention, the common regulator comprises a common position regulator which generates a common setpoint value for both drives, and at least one further regulator which generates an individual setpoint value for each drive from the common setpoint value.

In this configuration, the common regulator controls the travel movements of the two supports so to speak along a fictitious movement axis, which lies between the movement axes of the two drives. A position setpoint value along the fictitious movement axis between the two drives is thus approached by the common position regulator. Only the at least one further regulator, by taking into account the individual features of each drive travel, ensures that the two supports are individually brought into a position along their own movement axes which is dimensioned so that the fictitious "intermediate position" corresponds to the setpoint or specified value of the common position regulator. This configuration can be produced particularly simply and cost-effectively, since the common position regulation can be carried out with a single standard regulator for a single movement axis. Furthermore, this configuration significantly reduces the number of matching and adjustment steps needed for setting up.

In another configuration, an actual difference between the first and second displacement positions is determined, and the at least one further regulator comprises a synchronous regulator to which a quantity representing the actual difference is supplied as an input quantity.

This configuration is particularly advantageous when the synchronous regulator is subordinated to a common position regulator, which controls the basic positioning of the supports. The synchronous regulator is then responsible for controlling the movements of the two supports as synchronously as possible, by compensating for the actual difference between the displacement positions. This configuration can be produced particularly simply and cost-effectively, and it allows very good results in relation to the synchronicity of the two drives.

In another configuration a static difference value is provided, which represents a static difference between the first and second displacement positions, the static difference value is subtracted from the actual difference in order to obtain a dynamic difference value, and the synchronous regulator is supplied with the dynamic difference value as an input quantity.

This configuration is particularly advantageous when, further to the regulation of the two drives as proposed here, a computerized correction is also carried out for determining the space coordinates. This is because dividing the actual difference into a first (static) difference value component and a second (dynamic) difference value component makes it possible to carry out the computerized correction by using CAA (computer aided accuracy) methods which are known per se, but with a higher correction accuracy. The improvements thereby achievable in relation to the measurement accuracy of coordinate measuring machines of the type described here are the subject-matter of a parallel patent application by the present Assignee, which was filed simultaneously with this application and to which full reference is made in this regard. The advantageous correction of the measurement values as a function of the dynamic difference value (component) is furthermore described in exemplary embodiments of the present application. With respect to the present invention, the dynamic difference value is outstandingly suitable as an input quantity in order to balance out synchronicity differences between the two drives. Dividing the actual difference into the above two components also has the advantage that the synchronous regulation can be optimized for the varying conditions actually occurring during operation of the coordinate measuring machine. Work by the drives against the guides of an (accurately set up) coordinate measuring instrument is thereby better avoided. For example, the effect of a static component of the actual difference, due to the offset of a measuring scale, would be that the synchronous regulator lets the drives work against the guides. Such a problem is effectively avoided by the present configuration.

In another configuration, the first and second drives are switched off when the dynamic difference value exceeds a predefined threshold value.

This configuration makes it possible to reduce the control range of the synchronous regulator in a simple way to "small" deviations in the movements of the two drives. Larger deviations, on the other hand, are intended to be compensated for by realignment of the coordinate measuring machine. The configuration contributes particularly advantageously to preventing work by the drives against the guides and the associated wear and deformations.

In another configuration, the space coordinate is determined as a function of the dynamic difference value.

This configuration adopts the aforementioned idea of using the dynamic difference value not only for controlling the drives, but also for computerized correction of the recorded measurement values for determining the space coordinate. This configuration leads particularly efficiently to very accurate measurement results and to low-wear operation of the coordinate measuring machine.

In another configuration, the space coordinate determined as a function of the dynamic difference value is subsequently corrected by using the static difference value.

In this configuration, a correction of the position values obtained by the measuring instruments is thus first carried out with the aid of the dynamic difference value, and only then is the position value, already corrected once, corrected again by using the static difference value. This configuration has the advantage that the second correction can be carried out by means of known and established CAA tools, which in many cases are already used for correcting static guide errors (correction of "waviness" in the guides etc.).

In another configuration, the common regulator actuates the first and second drives so that a drive current of approximately equal level results in both drives.

This configuration is particularly advantageous for aligning the new coordinate measuring machine. It contributes to preventing the drives from working against the guides, in particular in cases when the zero points of the separate measuring instruments for the two supports comprise an offset. This may on the one hand entail a suboptimal alignment of a new coordinate measuring machine. On the other hand, zero point errors can also occur because of temperature effects, for example because measuring scales arranged separately from one another on a coordinate measuring machine may be heated to different extents. Additionally taking the level of the drive currents into account prevents the common regulator from stressing the guides of the coordinate measuring machine too strongly in such a case of "displaced measuring instruments". This configuration is particularly advantageous for achieving synchronous movement of the two supports over long time periods, and particularly when an increasing static difference occurs between the displacement positions of the two supports owing to temperature changes and/or wear phenomena.

In another configuration, the drive current for the first and second drives is limited to a predefined maximum value, the predefined maximum value preferably being equal to the current value needed for an acceleration of the respective supports.

This configuration ensures that the new coordinate measuring machine is not damaged even in the event of total failure of the common regulator. Indirectly, therefore, the high accuracy of the new coordinate measuring machine is also ensured.

In another configuration, the common regulator comprises a common rotary speed regulator for the first and second drives, to which an average rotary speed value of the first and second drives is supplied as an actual rotary speed.

This configuration allows very simple and efficient control of the two supports. In particular, this configuration leads to the two drives respectively generating the same forward increment forces. With very rigid coupling of the two supports, as is often the case with coordinate measuring machines in gantry design, very high synchronicity is directly achieved.

In another configuration, the common regulator comprises a current regulator for each drive, the current regulators receiving a common setpoint value from the common rotary speed regulator.

This configuration is particularly simple and cost-effective to produce, and it leads to control without constraining forces in the case of coordinate measuring machines with very rigid coupling of the two supports.

It is to be understood that the features mentioned above and those yet to be explained below may be used not only in the respectively indicated combination, but also in other combinations or individually, without departing from the scope of the present invention.

BRIEF DESCRIPTION OF THE DRAWINGS

Exemplary embodiments of the invention are represented in the drawing and will be explained in more detail in the following description. In the drawing.

DESCRIPTION OF PREFERRED EMBODIMENTS

Figure 1:
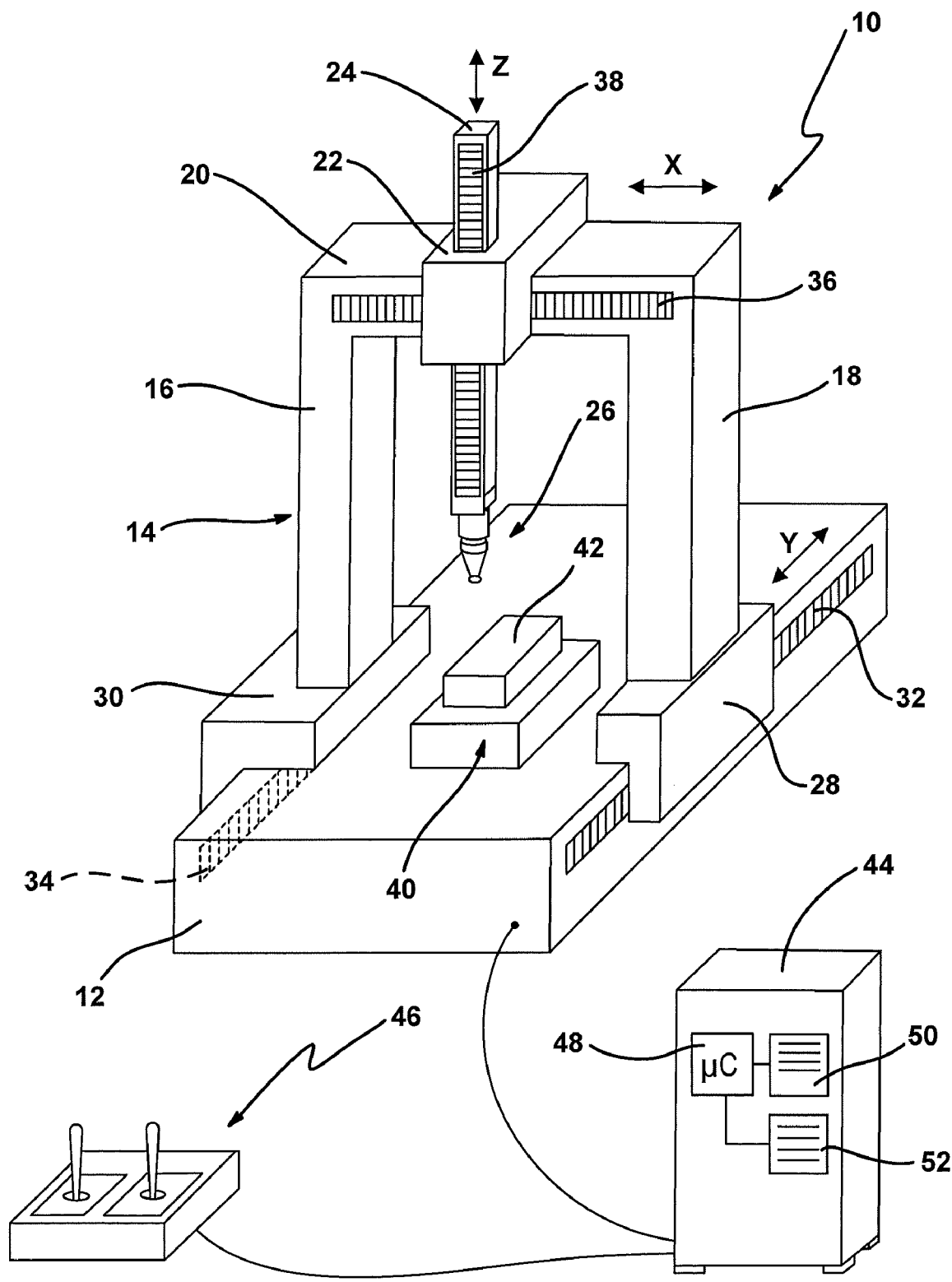
FIG. 1 shows a simplified representation of a preferred embodiment of the new coordinate measuring machine.

In FIG. 1, an exemplary embodiment of the new coordinate measuring machine is denoted overall by reference numeral 10.

The coordinate measuring machine 10 has a base 12, on which a portal 14 is arranged so that it can be displaced in the longitudinal direction (Y direction). The portal 14 has two portal feet (more generally: supports) 16, 18, which are connected by a bridge 20 at their other ends. A carriage 22, which can be displaced along the bridge, i.e. in a space direction (X direction) connecting the two portal feet 16, 18, is placed on the bridge 20. A ram 24, which can be displaced in a third space direction (Z direction) perpendicular to the first and second space directions, is arranged on the carriage 22. The three space directions X, Y and Z are preferably orthogonal to one another, although this is not absolutely necessary for the present invention.

A probe head 26, on which a stylus (not referred to in further detail) is arranged, is fastened on the lower free end of the ram 24. The stylus is used in a manner known per se for touching an object to be measured. The present invention is not restricted to a tactile coordinate measuring machine, however, and may likewise be used for coordinate measuring machines in which a measurement point is approached in a non-contact manner, i.e. for example a coordinate measuring machine with an optical scanning head. Furthermore, the invention is not restricted to a coordinate measuring machine in the portal design as shown here. It may equally (and preferably) be used for coordinate measuring machines in gantry design, in which only the bridge 20 with two supports can travel along two highly placed fixed rails. Moreover, the invention may generally be used for all coordinate measuring machines in which the probe head is displaced in at least one movement direction with the aid of two mutually separated drives.

In this exemplary embodiment, the portal feet 16, 18 respectively have their own drive 28, 30 which allows movement of the portal in the Y direction.

Two measuring scales 32, 34, which extend parallel to the Y direction, are schematically represented on the long sides of the base 12. In preferred embodiments, these are glass measuring scales with which the Y direction of the portal feet 16, 18 can be determined separately from one another. The measuring scales 32, 34 are therefore part of two measuring instruments for the Y position of the probe head 26. It is to be understood that these measuring instruments may furthermore contain suitable sensors for reading the measuring scales 32, 34, although these are not represented here for the sake of simplicity. It should furthermore be pointed out that the invention is not restricted to the use of glass measuring scales, and may be used with other measuring instruments for recording the Y position of the probe head.

Another measuring scale 36 is arranged parallel to the X direction on the bridge 20. Finally, another measuring scale 38 is also arranged parallel to the Z direction on the ram 24. By means of the measuring scales 36, 38, it is possible to record the present X position and Z position of the probe head 26 metrologically in a manner which is known per se.

Reference numeral 40 denotes a measuring object, on which the space coordinates of the measurement point 42 are intended to be determined.

Reference numeral 44 denotes a control and evaluation unit, which is designed to actuate the drives of the coordinate measuring machine 10 so that the probe head 26 travels to the measurement point 42. For manual operation, the control unit 44 may be connected to a user console 46. It is also possible for the control unit 44 to fully automatically approach and measure measurement points 42 of the object 40 to be measured.

The control unit 44 contains a processor 48 and a plurality of memories, which are represented here by the reference numerals 50 and 52 for the sake of simplicity. A computer program, by means of which the method explained below can be carried out, is stored in the memory 50. Static difference values, which according to one exemplary embodiment of the new method have been determined in a calibration run, are permanently stored in the memory 52.

Figure 2:
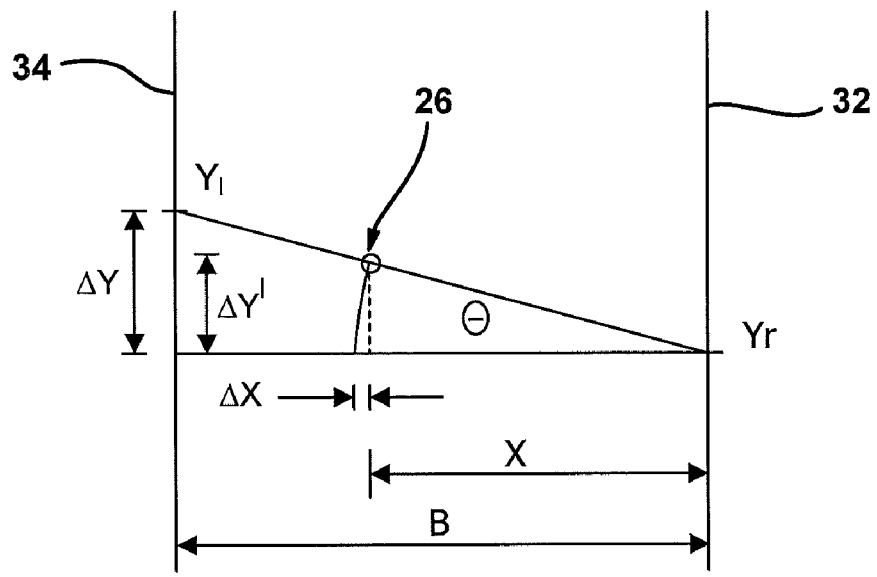
FIG. 2 shows a schematic representation to explain measurement errors which are caused by an unequal forward increment of the portal feet of a coordinate measuring machine of the type shown in FIG. 1.

FIG. 2 shows a simplified geometrical representation with the two measuring scales 32, 34 for determining the Y position of the probe head 26. It is to be assumed in this case that the probe head 26 lies at the position denoted by a circle. This position results from a displacement of the probe head 26 in the X direction by the amount X, measured from the right-hand outer end of the measuring scale 36, and a displacement of the probe head 26 in the Y direction to the setpoint position $Y_r$. For various reasons, for example a lack of synchronicity of the drives 28, 30 or because of oscillations of the portal 14, however, the measurement positions $Y_l$ and $Y_r$ are separated from each other by the actual difference $\Delta Y$. The true offset of the probe head 26 from the measuring scale 32 used as a reference here is then $\Delta Y'$, and it is dependent on the respective X position of the probe head 26 as can be seen from the representation in FIG. 2.

Owing to the rotation due to the unequal Y positions on the two measuring scales 32, 34, the probe head 26 also experiences a deviation in the X direction, which is denoted as $\Delta X$ here.

The correction value $\Delta Y'$ for the Y position is obtained by the known geometrical ray law as $$\Delta Y' = \Delta Y \cdot \frac{X \pm L_x}{B} = (X \pm L_x) \cdot \tan\theta,$$

where B is the distance between the two measuring scales 32, 34 and $L_x$ is the length of the stylus (not represented here) in the X direction.

The correction value $\Delta X$ is furthermore obtained as $$\Delta X = L_Y \tan\theta\theta$$

where $L_Y$ is the length of the stylus (not represented here) in the Y direction.

The deviations represented in FIG. 2 contain a reproducible error component, in particular statistical and possibly elastic guide errors, as well as an irreproducible component which varies with each measurement value recording. The reproducible component will be approximated below by the static difference value, and the irreproducible component by the dynamic difference value.

Figure 3:
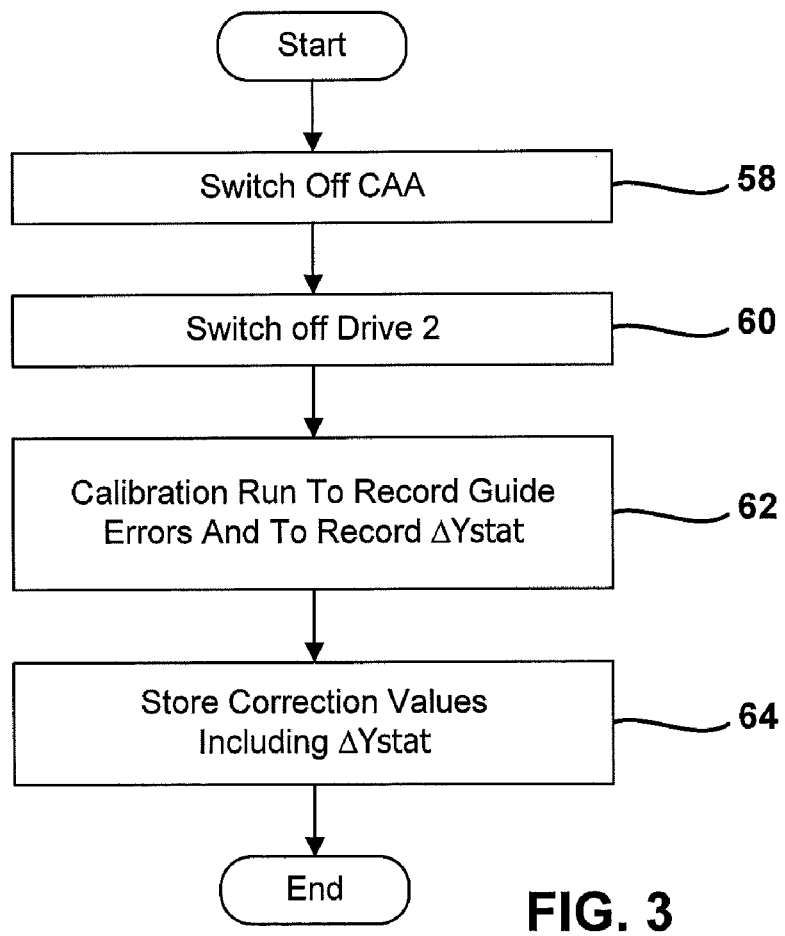
FIG. 3 shows a simplified flow chart which shows the provision of the static difference value.

FIG. 3 shows an embodiment of the way in which a static difference value $\Delta Y$stat can be determined. To this end, according to step 58, the computerized error correction (CAA) conventionally provided in coordinate measuring machines is first switched off. According to step 60, the second drive for the portal 14 is also switched off, i.e. for example the drive 30, or the calibration run is carried out before connecting up the second drive 30. In other words, the portal 14 is advantageously moved by only one of the drives 28, 30 in order to record the static difference value $\Delta Y$stat.

According to step 62, a calibration run is subsequently carried out along the Y direction, while measurement values for future correction of guide errors are recorded at defined support points. At least one static difference value $\Delta Y$stat, which corresponds for the calibration run to the difference value $\Delta Y'$ in FIG. 2 for a particular position of the probe head 26, is also determined. Static difference values $\Delta Y$stat are preferably recorded for a multiplicity of probe head positions 26, in order to adapt the correction of the position values to the respective probe head position 26.

Finally, in step 64, all the correction values including the static difference value or values $\Delta Y$stat are stored in the memory 52 of the coordinate measuring machine 10.

Figure 4:
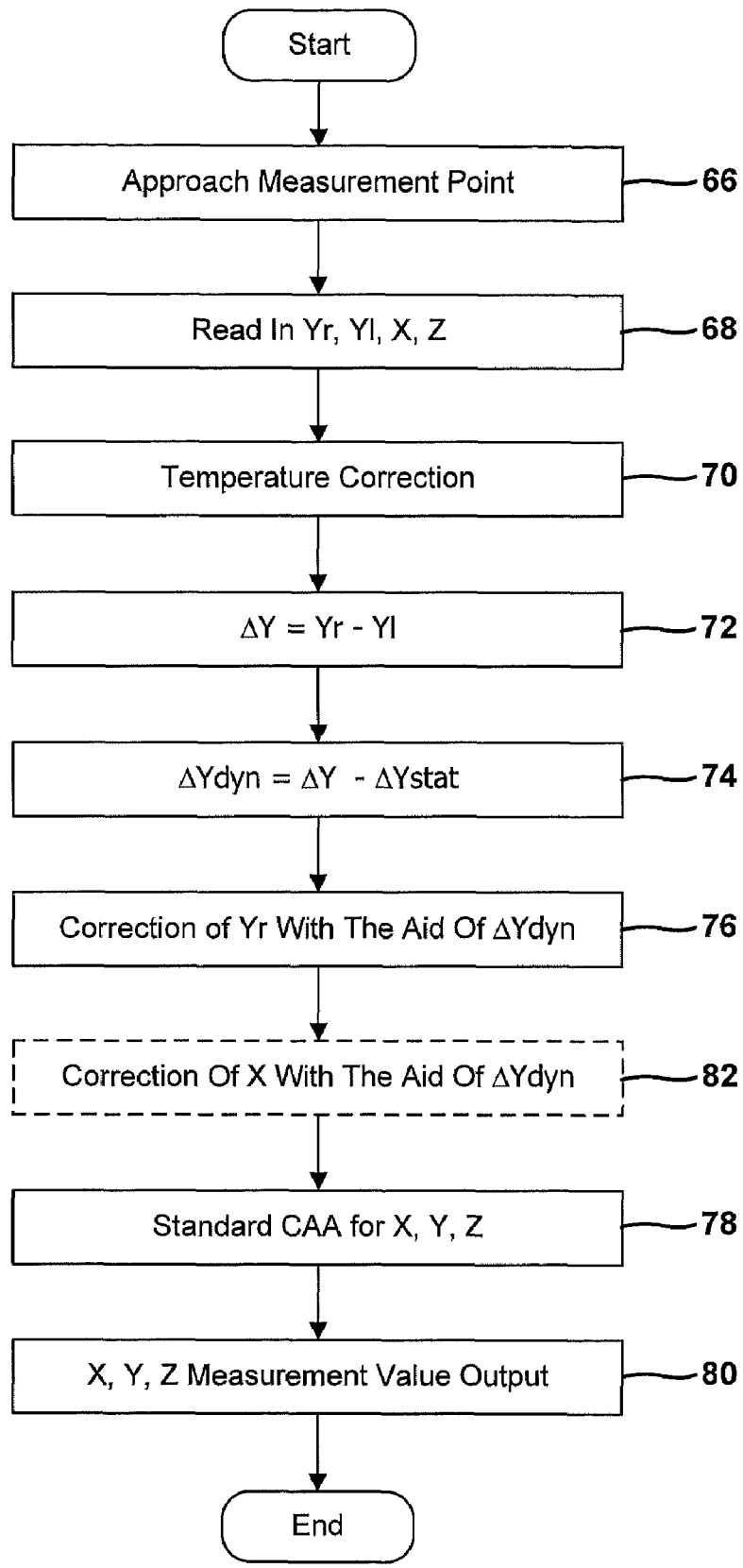
FIG. 4 shows a simplified flow chart to explain an embodiment of the method according to the invention.

FIG. 4 shows an embodiment of the way in which the space coordinates can be determined. According to step 66, the measurement point 42 is approached by the probe head 26. After the measurement point 42 is reached, the space coordinates of the probe head 26 are read in by means of the measuring scales 32, 34, 36, 38. Coordinate values $Y_r$, $Y_l$, X and Z are thereby obtained. (For the sake of simplicity, deflections of the stylus when sampling the measurement point 42 are not considered here. It is nevertheless to be understood that such deflections may be taken into account in a manner known per se for determining the space coordinate, when the measurement is carried out by a corresponding stylus.)

According to step 80 temperature compensation is subsequently carried out, i.e. a correction of the recorded measurement values $Y_r$, $Y_l$, X and Z by means of the respective ambient temperatures and the thermal expansion coefficients of the measuring scales 32 to 38. The correction of the measurement values is preferably carried out as a function of the temperature of each individual measuring scale 32 to 38.

In the next step 72, the actual difference $\Delta Y$ between the (temperature-corrected) Y position measurement values $Y_l$, $Y_r$ is determined. According to step 74, a dynamic difference value $\Delta Ydyn$ is then determined by subtracting the stored static difference value $\Delta Ystat$ from the actual difference $\Delta Y$.

In the next step 76, the Y position of the probe head 26 is determined using the dynamic difference value $\Delta Ydyn$ by correcting the value $Y_r$ delivered by the measuring scale 32 with the dynamic difference value $\Delta Ydyn$ (addition or subtraction, depending on the direction of the deviation).

Subsequently according to step 78, a standard correction known per se is carried out for all the recorded measurement values X, Y, Z by using the correction values recorded in the calibration run. In this case, however, the Y position of the probe head 26 already corrected by the dynamic difference value is used as a starting point for the Y position of the probe head 26. In a preferred exemplary embodiment, the standard correction is carried out by means of the LASERCAL program which is available from the Assignee of the present invention for this purpose. Finally, the corrected position values X, Y, Z are output in step 80.

In a preferred variant of this embodiment, the X position of the probe head 26 is also determined by using the dynamic difference value or the dynamic correction value $\Delta X$ derived therefrom, before carrying out the standard correction in step 78.

The method described above for determining the space coordinates of the measurement point 42 may basically be carried out with coordinate measuring machines having only one drive for the portal 14, but more particularly with coordinate measuring machines having two separate drives for the portal feet 16, 18. In the latter case, the dynamic difference value is advantageously also used in order to control the two portal feet 16, 18 as synchronously as possible. As an alternative to this, such control of the drive may even be carried out without the measurement value correction described above.

Figure 5:
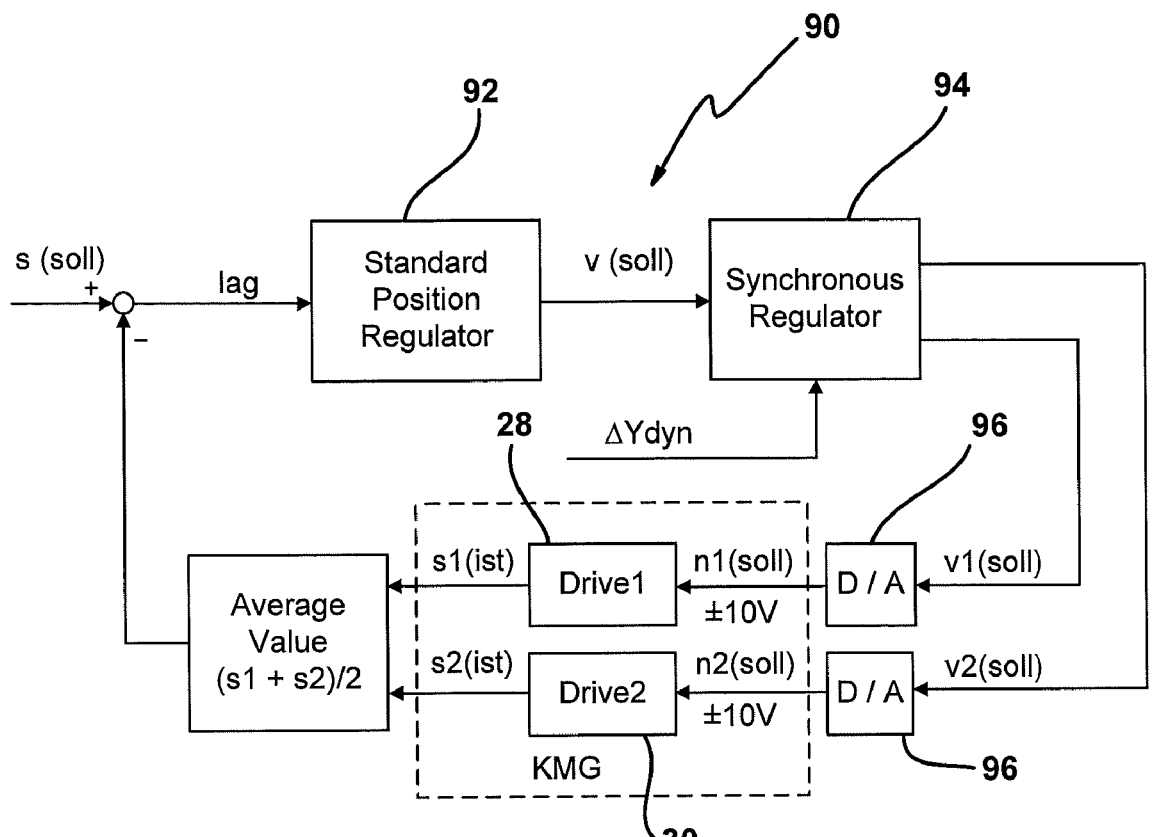
FIG. 5 shows a functional block diagram of a preferred regulator for a coordinate measuring machine of the type shown in FIG. 1.

In a preferred embodiment, the position regulation is carried out by a two-stage common regulator 90, as is schematically represented in FIG. 5. The common regulator 90 contains a position regulator 92, downstream of which a synchronous regulator 94 is connected. The position regulator 92 is a standard position regulator for one movement axis, such as may also be used in a coordinate measuring machine having only one drive for the Y direction. Here, however, it regulates the position of the portal 14 not along the motion axis of one of the drives, but along a fictitious drive axis which lies centrally between the two movement axes of the drives 28, 30. The respective position value is therefore provided as an average value of the positions s1 and s2 on the two axes. The position setpoint value $s_{(soll)}$ comes in a manner known per se from the control unit 44 of the coordinate measuring machine 10.

As a function of the difference between the setpoint position $s_{(soll)}$ and the (averaged) actual position $s_{(ist)}$, the position regulator 92 generates a specification value for the velocity of the two drives 28, 30. The specification value $v_{(soll)}$ is supplied to the synchronous regulator 94. The synchronous regulator 94 also receives the dynamic difference value $\Delta Ydyn$. From these two quantities, the synchronous regulator 94 generates two velocity specification signals $v1_{(soll)}$ and $v2_{(soll)}$, which are respectively supplied via a digital-analog converter 96 to the two drives 28, 30. The drives 28, 30 therefore receive a setpoint specification for the rotary speed and set a corresponding rotary speed. This leads in the known way to a positional displacement of the portal feet 16, 18, which is subsequently recorded via the measuring scales 32, 34. From the measurement values obtained, on the one hand the dynamic difference value $\Delta Ydyn$ is calculated and optionally used for correcting the measurement values obtained (cf. FIG. 4 above). The average actual position value is furthermore determined and supplied as a fictitious actual position value to the standard position regulator 92.

Figure 6:
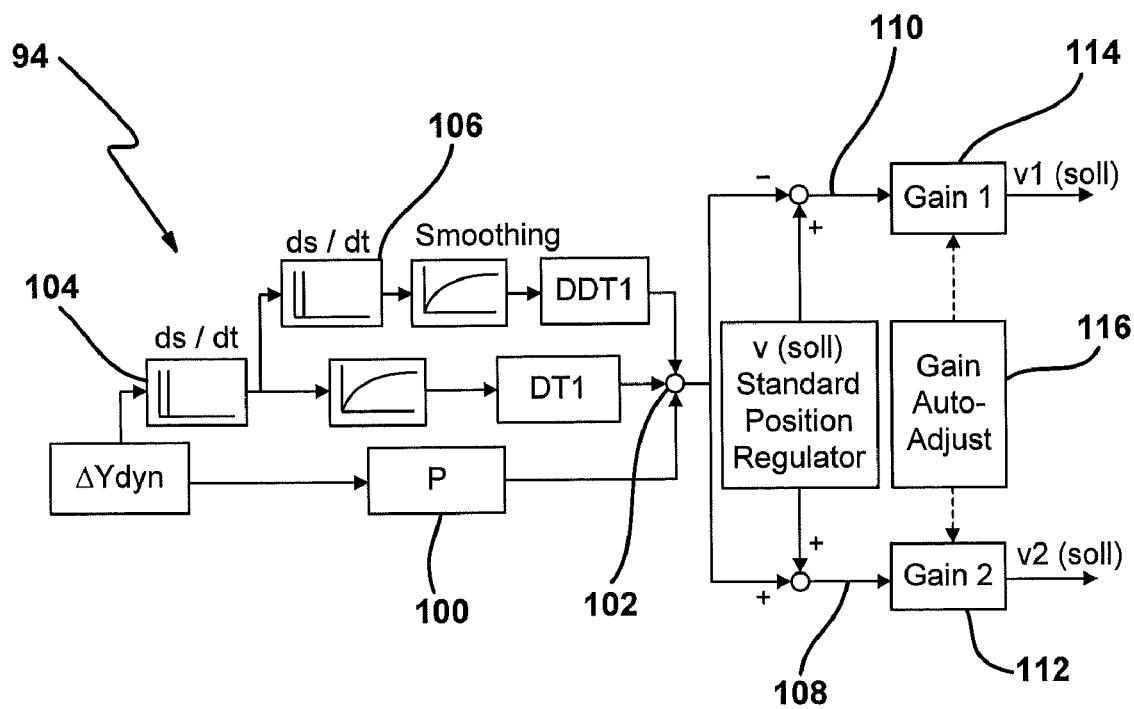
FIG. 6 shows a functional block diagram for a synchronous regulator, which may be employed in the regulator of FIG. 5.

FIG. 6 shows a preferred embodiment of the structure of the synchronous regulator 94. The synchronous regulator 94 receives the dynamic difference value $\Delta Ydyn$ as an input quantity. It supplies the dynamic difference value $\Delta Ydyn$ in a first branch via a proportional element 100 to a summation point 102. In a second branch, the synchronous regulator 94 differentiates the received dynamic difference value $\Delta Ydyn$ by means of a differentiator element 104 and it supplies the differentiated output value likewise to the summation point 102. In a third branch, the differentiated value is differentiated a second time (differentiator element 106) and supplied to the summation point 102. At the summation point 102, a control value is therefore obtained which comprises both a proportional component and a differential component differentiated once and twice with respect to time. The components may be weighted using factors P, DT1 and DDT1. Furthermore, the output values of the differentiation components 104, 106 may also be smoothed via a smoothing element. Increasing the P component leads to smaller dynamic difference values, but to an increasing oscillation susceptibility. The oscillation susceptibility of the synchronous regulator can be reduced by means of the factors DT1 and DDT1.

The control variable obtained at the summation point 102 is additively superimposed on the velocity setpoint specification of the standard position regulator 92 in a first branch 108. In a second branch 110, the control variable from the summation point 102 is subtractively superimposed on the velocity specification value of the standard regulator 92. The control variables obtained in this way are respectively supplied to an output stage 112, 114, which generates the velocity specification values for the two drives 28, 30. In order to compensate for different gain factors of the output stages 112, 114, in one embodiment automatic matching 116 is provided. In this case, the regulator integrates a dynamic difference occurring in a high constant velocity run over the gain factors. The dynamic difference value therefore becomes equal to zero on average.

In another embodiment, the regulator may manage different gain factors for positive and negative runs. In this way, different values can be compensated for as a function of the movement direction of the portal 14.

Figure 7:
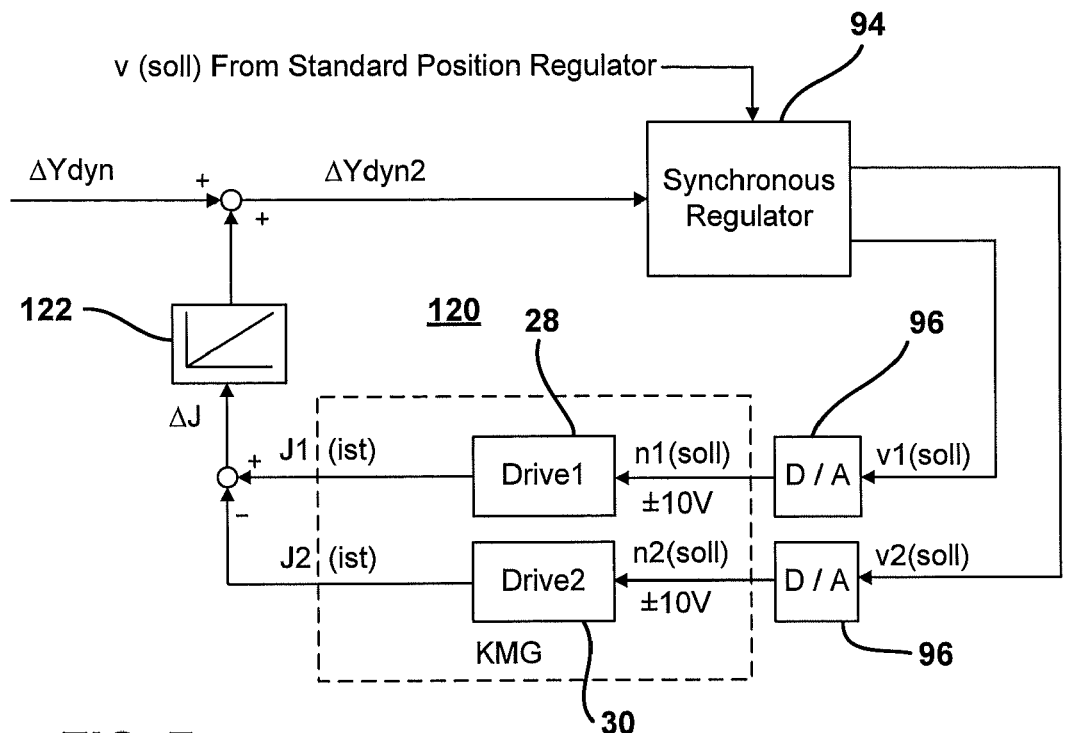
FIG. 7 shows an extension of the regulator shown in FIG. 5, in order to achieve high synchronicity even in long-term operation.

FIG. 7 shows an advantageous extension of the common regulator 90 in FIG. 5. The extension contains a further control loop 120 which does not, however, replace the control loop shown in FIG. 5 but supplements it. The further control loop 120 measures the drive currents $I1_{(ist)}$ and $I2_{(ist)}$ of the two drives 28, 30 and forms a difference current $\Delta I$ therefrom. The difference current $\Delta I$ is integrated via an integrator 122, and the value obtained is added to the dynamic difference value $\Delta Ydyn$. A corrected dynamic difference value $\Delta Ydyn2$ is thereby obtained, which is supplied to the synchronous regulator 94 instead of the uncorrected dynamic difference value ΔYdyn. In other regards, the synchronous regulator 94 operates as explained with the aid of FIG. 6.

The advantage of the regulator 90 extended according to FIG. 7 becomes noticeable when, in the course of time, the measuring instruments of the coordinate measuring machine 10 experience changes which lead to a (further) static difference value. Without the extension according to FIG. 7, the common regulator 90 would constantly attempt to compensate for such a further difference value component, which, however, would stress the guides of the coordinate measuring machine 10. By using the corrected dynamic difference value ΔYdyn2, this undesired result can be avoided. The integrator 122 ensures that a drive current of approximately equal level is set up in both drives. In other words, the effect of the control loop 120 is that the difference current ΔI becomes zero on average.

It is particularly advantageous for the corrected dynamic difference value ΔYdyn2 also to be used in method step 74 according to FIG. 4 for correcting the recorded position values. In this way, even higher accuracy can be achieved for determining the space coordinate.

It is furthermore particularly advantageous for the integrator 122 to have an adjustable gain $K_I$, so that the velocity of the control loop 120 can be varied. With a high integration gain $K_I$, the coordinate measuring machine 10 can automatically be adjusted to an unconstrained movement profile when setting up, by moving the portal 14 a few times to and fro directly after the calibration run. The corrected dynamic difference value ΔYdyn2 is thereby adapted automatically to a value which allows unconstrained movement of the two portal feet 16, 18. For the actual measurement operation, the integration gain $K_I$ is reduced or even switched off so that essentially or only the integrated difference current is used for correcting the dynamic difference value. In this way, slow adaptation takes place to corresponding variations of the coordinate measuring machine 10.

Figure 8:
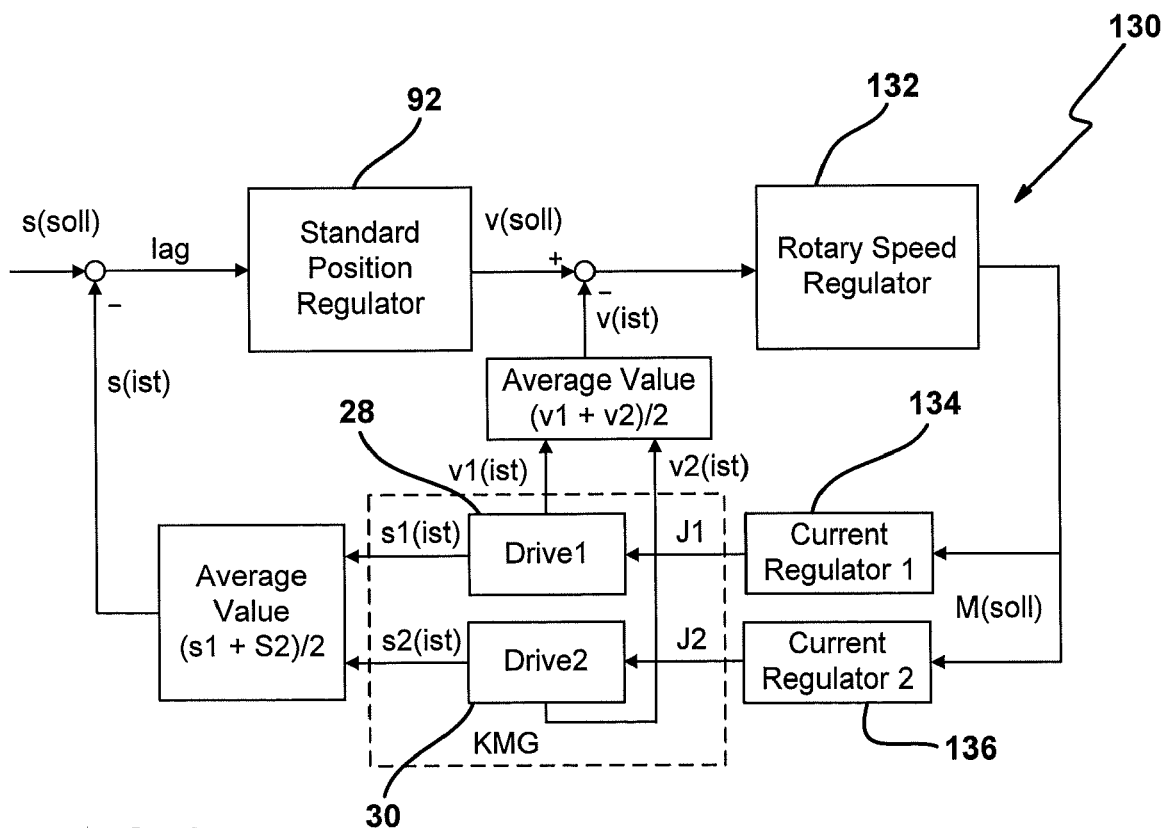
FIG. 8 shows another preferred embodiment of the common regulator.

FIG. 8 shows another preferred embodiment of a common regulator 130. Reference numerals which are the same refer to the same elements as before.

The regulator 130 likewise contains a standard position regulator 92, which receives a position setpoint value $s_{(soll)}$ from the control unit 44 of the coordinate measuring machine 10. It also receives an actual position value $s_{(ist)}$ as an average of the positions s1 and s2 of the two portal feet 16 and 18. From this, the standard position regulator 92 generates a specification value $v_{(soll)}$ which, however, is now supplied to a rotary speed regulator 132. The specification value $v_{(soll)}$ specifies a setpoint velocity of the two drives 28, 30, which the standard position regulator calculates from the position specification. The rotary speed regulator 132 receives the velocity setpoint value not directly, however, but reduced by the average actual velocity $v_{(ist)}$ which is given by the average value of the velocities v1 and v2 of the two drives 28, 30. The rotary speed regulator 132 generates a torque setpoint value $M_{(soll)}$ therefrom, which is supplied to two separate current regulators 134, 136. The current regulators 134, 136 form the drive currents for the two drives 28, 30 therefrom. Owing to this arrangement, the same forward increment force is always obtained for the two drives 28, 30. Constraint forces cannot in principle occur in this case, if the two portal feet 16, 18 are coupled together rigidly enough.

The common rotary speed regulator 132 may be constructed in either digital or analog form. In the case of a digital rotary speed regulator, the average actual velocity is obtained from the differentiated position signals s1 and s2 of the drives 28, 30. In the case of an analog rotary speed regulator, the respective tacho signals are averaged in analog fashion.

What is claimed is:

1. A method for determining at least one space coordinate of a measurement point on an object to be measured, comprising the steps of
   providing a probe head arranged on a displacement mechanism which comprises a first and a second support movable parallel to one another along a first axis, the first support being actuated by a first drive and the second support being actuated by a second drive mechanically separate from said first drive, for moving said displacement mechanism along said first axis,
   approaching the measuring point with the probe head,
   determining a first displacement position of the first support and determining a second displacement position of the second support,
   determining an actual difference value representative of an actual difference between the first and second displacement positions,
   providing a static difference value which represents a long-term static difference between the first and second displacement positions,
   subtracting the static difference value from the actual difference value in order to obtain a dynamic difference value, and
   determining the space coordinate of the measurement point as a function of at least one of the first and second displacement positions,
   wherein the two drives are controlled by a common regulator which generates a separate drive signal having associated therewith a separate setpoint value for each of said first and second drives as a function of the dynamic difference value.

2. The method of claim 1, wherein the common regulator comprises a common position regulator for generating a common setpoint value for both drives, and a synchronous regulator generating an individual setpoint value for each drive from the common setpoint value, wherein the dynamic difference value is supplied to the synchronous regulator as an input quantity.

3. The method of claim 1, wherein the first and second drives are switched off when the dynamic difference value exceeds a predefined threshold value.

4. The method of claim 1, wherein the space coordinate is determined as a function of the dynamic difference value.

5. The method of claim 4, wherein the space coordinate determined as a function of the dynamic difference value is subsequently corrected by using the static difference value.

6. A method for determining at least one space coordinate of a measurement point on an object to be measured, comprising the steps of
   approaching the measuring point with a probe head arranged on a displacement mechanism which comprises a first and a second support movable parallel to one another, the first support being actuated by a first drive and the second support being actuated by a second drive,
   determining a first displacement position of the first support and a second displacement position of the second support, and
   determining the space coordinate of the measurement point as a function of at least one of the first and second displacement positions,
   wherein the two drives are controlled by a common regulator which generates a separate setpoint value for each drive, and wherein the common regulator comprises a common rotary speed regulator for the first and second drives, to which an average rotary speed value of the first and second drives is supplied as an actual rotary speed.

7. The method of claim 6, wherein the common regulator comprises a common position regulator which generates a common setpoint value for both drives, and at least one further regulator which generates an individual setpoint value for each drive from the common setpoint value.

8. The method of claim 7, wherein an actual difference value between the first and second displacement positions is determined, and wherein the at least one further regulator comprises a synchronous regulator to which a quantity representing the actual difference value is supplied as an input quantity.

9. The method of claim 8, further comprising the steps of
providing a static difference value which represents a static difference between the first and second displacement positions,
subtracting the static difference value from the actual difference value in order to obtain a dynamic difference value, and
supplying the dynamic difference value to the synchronous regulator as an input quantity.

10. The method of claim 9, wherein the first and second drives are switched off when the dynamic difference value exceeds a predefined threshold value.

11. The method of claim 10, wherein the space coordinate is determined as a function of the dynamic difference value.

12. The method of claim 11, wherein the space coordinate determined as a function of the dynamic difference value is subsequently corrected by using the static difference value.

13. The method of claim 6, wherein the common regulator actuates the first and second drives so that drive currents of approximately equal level result in both drives.

14. The method of claim 6, wherein drive currents for the first and second drives are limited to a predefined maximum value.

15. The method of claim 14, wherein the predefined maximum value is equal to a current value needed for an acceleration of the supports.

16. The method of claim 6, wherein the common regulator comprises a current regulator for each drive, the current regulators receiving a common setpoint value from the common rotary speed regulator.

17. A coordinate measuring machine for determining a space coordinate of a measurement point on an object to be measured comprising
a displacement mechanism having a first and a second support movable parallel to one another along a first axis,
a probe head arranged on the displacement mechanism for approaching the measuring point,
a first drive for moving the first support along said first axis and a second drive mechanically separate from said first drive for moving the second support along said first axis,
a first and a second measuring instrument for determining a first displacement position of the first support and for determining a second displacement position of the second support,
a first subtractor for determining an actual difference value representing an actual difference between the first and second displacement positions,
a memory providing a static difference value representing a static difference between the first and second displacement positions,
a second subtractor for subtracting the static difference value from the actual difference value in order to obtain a dynamic difference value,
a common regulator configured to control the first and second drives, and
a calculation unit for determining the space coordinate as a function of at least one of the first and second displacement positions,
wherein the common regulator is configured to generate a separate drive signal having associated therewith a separate setpoint value for each of said first and second drives as a function of the dynamic difference value.

18. The machine of claim 17, wherein the common regulator comprises a common position regulator which generates a common position value for both drives, and a synchronous regulator which generates an individual setpoint value for each drive as a function of the dynamic difference value.

19. The machine of claim 17, wherein the calculation unit is configured to determine the space coordinate as a function of the dynamic difference value.

* * * * *

UNITED STATES PATENT AND TRADEMARK OFFICE
CERTIFICATE OF CORRECTION

PATENT NO. : 7,599,813 B2  
APPLICATION NO. : 11/827063  
DATED : October 6, 2009  
INVENTOR(S) : Guenter Grupp Page 1 of 1

It is certified that error appears in the above-identified patent and that said Letters Patent is hereby corrected as shown below:

Title Page, Item [56] References Cited,
U.S. PATENT DOCUMENTS, Insert the following:

-- 5,398,603    3/1995    Hartmann et al.  
       6,025,689    2/2000    Prentice et al.  
       6,246,203 B1  6/2001    Abbott et al. --

Insert the following heading and information:
-- FOREIGN PATENT DOCUMENTS

EP    0 241 883    10/1987  
EP    0 436 209 A2  7/1991  
DE    40 38 779 A1  6/1992  
DE    41 34 371 A1  4/1993  
DE    42 18 604 C2  12/1993  
DE    196 51 427 A1  6/1998  
DE    102 49 713 A1  5/2004 --

Signed and Sealed this
Eighteenth Day of January, 2011

David J. Kappos
*Director of the United States Patent and Trademark Office*